United States Patent [19]

Sakagami et al.

[11] Patent Number: 4,775,590
[45] Date of Patent: Oct. 4, 1988

[54] OPTICAL FIBER

[75] Inventors: Teruo Sakagami; Naohiro Murayama, both of Iwaki, Japan

[73] Assignee: Kureha Kagaku Kogyo Kabushiki Kaisha, Tokyo, Japan

[21] Appl. No.: 887,208

[22] Filed: Jul. 21, 1986

[30] Foreign Application Priority Data

Jul. 26, 1985 [JP]  Japan ................................ 60-163957
Aug. 28, 1985 [JP]  Japan ................................ 60-187351

[51] Int. Cl.⁴ .............................................. D02G 3/00
[52] U.S. Cl. .................................. 428/373; 428/375;
428/376; 428/392; 428/394; 350/96.29;
350/96.30; 350/96.34
[58] Field of Search ............... 428/373, 375, 394, 392,
428/376; 350/96.29, 96.30, 96.34

[56]            References Cited
            U.S. PATENT DOCUMENTS

| 3,993,834 | 11/1976 | Chimura et al. | 428/373 |
| 3,999,834 | 12/1976 | Ohtomo et al. | 428/394 |
| 4,138,194 | 2/1979 | Beasley et al. | 428/373 |
| 4,381,269 | 4/1983 | Kaino et al. | 428/373 |
| 4,544,235 | 10/1985 | Nishida et al. | 350/96.30 |
| 4,557,562 | 12/1985 | Ohmori et al. | 350/96.34 |
| 4,568,146 | 2/1986 | Ueba et al. | 428/394 |
| 4,576,438 | 3/1986 | Tatsukami et al. | 428/394 |
| 4,593,974 | 6/1986 | Yamamoto et al. | 428/394 |
| 4,615,584 | 10/1986 | Ohmori et al. | 350/96.34 |

FOREIGN PATENT DOCUMENTS 128517 12/1984 European Pat. Off. .
153414  9/1985 European Pat. Off. .

Primary Examiner—Sharon A. Gibson
Attorney, Agent, or Firm—James Creighton Wray

[57]            ABSTRACT

A resin-made optical fiber is composed of a core of a polymer or copolymer obtained from a polymerizable monomer, which contains at least 1 wt. % of a cross-linkable monomer, and a cladding of a polymer of copolymer having a refractive index smaller than the core. The optical fiber is fabricated by filling a polymerizable monomer into a hollow fiber like cladding material, which is adapted to form a cladding and is made of a polymer or copolymer, and then placing the resultant composite material under polymerizing conditions to polymerize the polymerizable monomer. The latter step may preferably be carried out by causing the composite material to travel continuously in the direction of its length into a polymerization zone where conditions for the polymerization of the polymerizable monomer are satisfied, whereby the polymerizable monomer is successively polymerized to form a core having a refractive index greater than the cladding.

4 Claims, 1 Drawing Sheet

OPTICAL FIBER

BACKGROUND OF THE INVENTION (1) Field of the Invention

This invention relates to a resin-made optical fiber having excellent light-carrying capacity and a fabrication process of the same.

(2) Description of the Prior Art

It has been known over many years to use light-carrying optical fibers, each of which is composed of a core and a cladding on the outer wall of the core, as information transmitting means. Both glass-made and resin-made optical fibers are now actually employed. Although resin-made optical fibers are somewhat inferior in light-carrying capacity to their glass-made counterparts at this stage, they have practically advantageous merits such that they can be connected together rather easily, have light weights and superb flexibility, and can be fabricated at relatively low costs. For these merits, resin-made optical fibers have recently been finding utility in various fields.

As a conventional fabrication process of such resin-made optical fibers, it has been known to obtain a highly-transparent and amorphous polymer or copolymer such as polymethyl methacrylate, polystyrene, polycyclohexyl methacrylate or polyphenyl methacrylate; to heat, melt and to mold the polymer or copolymer by an extruder or the like to form a fibrous member; and then to form, by the dipping technique, coextruding technique or the like, a cladding on the fibrous member as a core in such a way that the outer wall of the fibrous member is covered under the cladding. Specifically, it is disclosed, for example, in Japanese Patent Publication Nos. 42261/1978 and 42260/1978 that a monomer capable of providing a polymethyl acrylate polymer or copolymer having excellent transparency, mechanical properties, weatherability, etc., is used by way of example, impurities are removed from the monomer to avoid any detrimental effects to the light-carrying capacity, the thus-purified monomer is polymerized by the continuous bulk polymerization process to obtain a polymer, and the polymer is thereafter heated, molten and molded to obtain a fiber useful as a core.

In conventional fabrication processes such as those described above, fibrous members useful as cores are fabricated by melt molding. Corollary to this, their materials, namely, polymers must have excellent melt moldability. For this reason, the provision of polymers with improved melt moldability has been the subject of a great deal of work, including the addition of various chain transfer agents or the like upon polymerization with a view toward reducing the molecular weights and hence lowering the melt viscosities.

However, the conventional processes are accompanied by a problem that a significant limitation is imposed on the types of polymers usable as core materials. Since melt molding is essential, it has been absolutely impossible to use as core materials, e.g., polymers which are unstable at high temperatures required for melt molding or which have large molecular weights and hence high melt viscosities or which possess high crosslinking structure.

Reflecting the recent diversification of the information technology, a variety of properties are now required for resin-made optical fibers, including those having high heat distortion temperatures, those having high heat resistance and durability at elevated temperatures, etc. However, the conventional processes are unable to form cores from such materials.

When a polymer is subjected to melt molding, there is a danger that some impurities could mix from outer sources into the polymer or the polymer could be deteriorated or modified at high temperatures and the high transparency of the polymer could hence be sacrificed. This tendency becomes more pronounced when one or more additives are used to improve the melt moldability.

SUMMARY OF THE INVENTION

An object of this invention is to provide an optical fiber having such high heat resistance that no conventional processes can provide.

Another object of this invention is to provide a process for the fabrication of a resin-made optical fiber which permits selection of a core material from a wide range of materials and has various excellent properties, especially, superb heat resistance.

In one aspect of this invention, there is thus provided a resin-made optical fiber comprising:
  a core of a polymer obtained from a crosslinkable monomer or of a copolymer obtained from a monomer composition which comprises at least 1 wt % of a crosslinkable monomer and at least one monomer selected from a group consisting of acrylates, methacrylates and aromatic vinyl compounds, said crosslinkable monomer being selected from a group consisting of acrylic or methacrylic esters of di- or poly-hydric alcohols, divinyl aromatic compounds and di- or poly-allyl compounds, and
  a cladding of a polymer or copolymer having a refractive index smaller than the core.

In another aspect of this invention, there is also provided a process for the fabrication of a resin-made optical fiber, which comprises:
  filling a polymerizable monomer into a hollow fiber like cladding material adapted to form a cladding and made of a polymer or copolymer;
  placing the resultant composite material under polymerizing conditions to polymerize the polymerizable monomer, thereby forming a core having a refractive index greater than the cladding.

In a further aspect of this invention, there is also provided a process for the fabrication of a resin-made optical fiber, which comprises:
  filling a polymerizable monomer into a hollow fiber like cladding material adapted to form a cladding and made of a polymer or copolymer;
  causing the resultant composite material to travel continuously in the direction of the length of the composite material and allowing the composite material to advance successively into a polymerization zone where conditions for the polymerization of the polymerizable monomer are satisfied, whereby the polymerizable monomer is successively polymerized to form a core having a refractive index greater than the cladding.

In the above processes of this invention, the core-forming polymerizable monomer contains at least 1 wt. % of a crosslinkable monomer.

In the resin-made optical fiber of this invention, the core is made of a crosslinked polymer. Accordingly, its heat resistance and durability are great.

In each of the processes of this invention, the core-forming polymer (or copolymer) is formed by polymerizing the polymerizable monomer within the cladding material. It is thus possible to use, as a core material, a polymer the melt molding of which is not feasible. A resin-made optical fiber having high heat resistance can therefore be obtained easily, for example, by using a crosslinkable monomer. Further, it is possible to prevent mixing of impurities into cores from outer sources. Resin-made optical fibers having good characteristics can hence be obtained.

The above and other objects, features and advantages of the present invention will become apparent from the following description and the appended claims, taken in conjuction with the accompanying drawings.

BRIEF DESCRIPTION OF THE DRAWINGS

In the accompanying drawings

DETAILED DESCRIPTION OF THE INVENTION AND PREFERRED EMBODIMENTS

Figure 1:
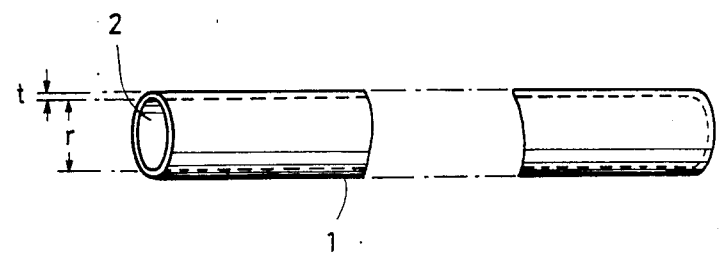
FIG. 1 is a simplified schematic perspective view of a cladding material useful in the fabrication of a resin-made optical fiber according to this invention.

In the present invention, there is fabricated, as shown in FIG. 1, a hollow fiber like cladding material 1 which becomes a cladding of an optical fiber. No particular limitation is imposed on the material of the cladding material 1. Any known material can thus be used. It is however required to have a refractive index smaller than its associated core, which will be described infra. The material may desirably be a polymer the refractive index of which is smaller, preferably by at least 1%, more preferably by at least 3% than the refractive index of the associated core. Accordingly, the range of materials from which a material can be selected for the cladding material 1 is rendered narrower when the core is made of a material having a low refractive index, for example, in the range of 1.48–1.50. As a matter of fact, a melt-moldable thermoplastic resin is preferable as a material for the cladding material 1.

As exemplary polymers proposed as materials for such cladding materials, may be mentioned those disclosed in U.K. patent Specification No. 1,037,498, for example, polymers or copolymers of vinyl fluoride, vinylidene fluoride, tetrafluoroethylene, hexafluoropropylene, trifluoromethyl trifluorovinyl ether, perfluoropropyl trifluorovinyl ether, and fluoroesters of an acrylic acid or methacrylic acid represented by the following structural formula:

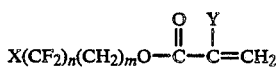

wherein X means F, H or Cl, n stands for an integer of 2–10, m is an integer of 1–6, and Y denotes $CH_3$ or H, as well as copolymers of the above-mentioned monomers and esters of acrylic acid or methacrylic acid and lower alcohols (for example, methanol, ethanol, etc.).

Furthermore, substantially amorphous copolymers which may be obtained from a compound represented by the following formula:

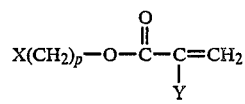

wherein X and Y have the same meaning as defined above and p stands for an integer of 1–16, and the methyl or ethyl ester of acrylic acid or methacrylic acid may also be employed suitably. Besides, the tetrafluoroethylene-ethylene copolymer and the like disclosed in U.S. Pat. No. 2,468,664 may also be used suitably.

When the refractive index of the material of the core is large, it is also possible to use ethylene resin, propylene resin, 4-methylpentene-1 resin, vinyl chloride resin, vinylidene chloride resin, etc. besides the above-described polymers and copolymers.

The cladding material 1 can be obtained by molding a polymer such as those described above into a tubular hollow fiber having a hollow channel 2. Any coventionally-known process may be employed as a process for the formation of the tubular hollow fiber. It may be fabricated, for example by continuously molding a suitable polymer in a high-temperature molten state into a tubular shape by an extruder or the like. No particular limitation is vested on the diameter r of the hollow channel 2. Although the hollow channel 2 may have a suitable diameter corresponding to the application purpose of the optical fiber as a final product, the diameter is usually from 1 $\mu$m to 5 mm or so. This diameter of the hollow channel 2 becomes the diameter of the core. In the case of an optical fiber for transmitting light from a large light source, for example, a light-emitting diode (LED), the greater the diameter of the hollow channel 2, the more advantageous. When the light to be transmitted is light from a small light source like laser beam, smaller core diameters are more suitable for the admission of the incident light. Hence, a small diameter is chosen for the hollow channel 2. In this case, another merit is brought about that the minimum bend radius is kept small.

Since the cladding material 1 becomes the cladding for reflecting light which propagates through the core, no limitation is imposed on the wall thickness t of the cladding material so long as the wall thickness is at least several times the wavelength of light to be transmitted. The wall thickness t is set generally at 5–100 $\mu$m, preferably 10–50 $\mu$m or so.

In the present invention, a polymerizable monomer is filled within the hollow channel 2 of the hollow fiber like cladding material 1 and the resulting composite material is placed under polymerizing conditions to polymerize the polymerizable monomer, thereby forming a core.

Here, as the polymerizable monomer, used is a crosslinkable monomer or a monomer composition containing a crosslinkable monomer. The term "monomer or monomer mixture" as used herein means a polymerizable material or mixture thereof. It does not necessarily mean monomers only. Therefore, somewhat polymerized prepolymers may also be used. As a matter of fact, any material can be used so long as it is polymerizable and has sufficient fluidity to permit its filling into the hollow channel 2 of the cladding material 1. Since no melt molding is required in the present invention, a polyfunctional monomer or a mixture of such monomers may be used as the above-mentioned polymerizable material. It is unnecessary that monomers to be used are all bifunctional or still higher polyfunctional monomers. Use of such a crosslinkable monomer or a monomer mixture containing a crosslinkable monomer can bring about such merits that a core made of a crosslinked polymer or copolymer is formed to provide an optical fiber having excellent heat resistance and upon polymerization of the monomer or monomer mixture, the so-called "blank" of the core due to shrinkage of the monomer or monomer mixture is rendered hard to occur. In order to obtain such advantageous effects, it is preferable to incorporate the crosslinkable monomer component in an amount of at least 1 wt. %, preferably, at least 3 wt. % based on the monomer mixture. Needless to say, all monomers may be bifunctional or still higher polyfunctional monomers.

In the present invention, it is possible to use, as bifunctional or still higher polyfunctional monomers, the acrylic or methacrylic esters of dihydric or still higher polyhydric alcohols, such as ethylene glycol diacrylate, ethylene glycol dimethacrylate, 2,2-bis[4-acryloxyethoxyphenyl]propane, 2,2-bis[4-methacryloxyethoxyphenyl]propane, trimethylolpropane triacrylate and trimethylolpropane trimethacrylate, 2,2 bis (4-methacryloxyethoxy-3,5-dibromophenyl)propane; aromatic compounds such as divinylbenzene; crosslinkable monomers containing two or more allyl groups as functional groups, represented by diethylene glycol bis(allylcarbonate) (e.g., "CR-39"), diallyl phthalate and triallyl isocyanate; etc. These bifunctional and still higher polyfunctional monomers may be used either singly or in combination.

As comonomers usable in combination with these crosslinkable monomers for their copolymerization, monomers copolymerizable with such crosslinkable monomers are used. As such monomers, may be mentioned, acrylic esters and methacrylic esters such as methyl acrylate, methyl methacrylate, n-butyl acrylate, n-butyl methacrylate, 2-ethylhexyl acrylate, 2-ethylhexyl methacrylate, isobutyl acrylate, isobutyl methacrylate, tert-butyl acrylate, tert-butyl methacrylate, phenyl acrylate, phenyl methacrylate, benzyl acrylate, benzyl methacrylate, cyclohexyl acrylate, cyclohexyl methacrylate, 2-hydroxyethyl acrylate, 2-hydroxyethyl methacrylate, tribromophenyl acrylate, tribromophenyl methacrylate, acryloxydiethoxytribromobenzene and methacryloxydiethoxytribromobenzene; and aromatic vinyl compounds such as styrene, α-methylstyrene and monochlorostyrene. The above-mentioned polymerizable monomers or monomer mixtures may contain a polymerization initiator, polymerization additive, chain transfer agent for the regulation of molecular weight, etc.

No particular limitation is imposed on the method for filling a polymerizable monomer, prepared in the above-mentioned manner, into the hollow channel 2 of the cladding material 1. This can be effected, for example, by inserting one end of the cladding material in the polymerizable monomer contained in a vessel and then applying a negative pressure to the other end so as draw the polymerizable monomer into the hollow channel 2 or alternatively, by causing the polymerizable monomer to flow under pressure into the hollow channel 2 through one end of the cladding material 1 so as to fill the hollow channel 2 with the polymerizable monomer. After filling the polymerizable monomer in the cladding material, both ends of the cladding material are sealed. Thereafter, the resulting composite material is, for example, heated by heating meansoor the like to polymerize the polymerizable monomer in the cladding material. At this stage, the composite material may be placed in its entirety in an inert atmosphere such as nitrogen gas, whereby the polymerization may be allowed to proceed smoothly. The type of the polymerization initiator, polymerization temperature and other conditions may be chosen suitably, for example, depending on the type of each polymerizable monomer to be used. Usually, a radical polymerization initiator such as lauroyl peroxide, isopropyl peroxydicarbonate or methyl ethyl ketone peroxide may be successfully used. The polymerization temperature may be chosen from room temperature to 150° C. In some instances, photopolymerization may be effected in the presence of a photopolymerization initiator.

According to the above-described process, a polymer-made core is formed by subjecting a composite material, which is composed of a cladding material and a polymerizable monomer filled within the hollow channel of the cladding material, to a polymerization treatment so as to polymerize the polymerizable monomer without need for any means for melting and molding a polymer for the formation of a core. Accordingly, the polymerizable monomer may be chosen a broad range of monomers. By using a crosslinkable, bifunctional or still higher polyfunctional monomer as a part or the entire part of the polymerizable monomer, it is possible to obtain an optical fiber with a core made of a crosslinked polymer or copolymer which has not been available theoretically by any conventional processes. Such optical fibers have excellent heat resistance and can be used for various applications. Inclusion of a crosslinkable monomer in the polymerizable monomer can avoid the blank which would otherwise occur due to volume shrinkage in the cladding material upon polymerization. It is also possible to reduce the possibility of mixing of impurities which tends to occur when a polymer is subjected to melt molding. It is thus possible to form a core having excellent light-carrying capacity.

When the composite material composed of the cladding material and the polymerizable monomer filled in the cladding material is placed as a whole under polymerization conditions in order to polymerize the monomer as described above, some substantial volume shrinkage may occur, depending on the composition of the polymerizable monomer, in the polymerizable monomer in the cladding material upon its polymerization. Due to this shrinkage, the resulting polymer which is supposed to form a core may hence be cut partly within the cladding material. Furthermore, the cladding material may be deformed due to a drop in its internal pressure as a result of the volume shrinkage of the crosslinkable monomer and the cross-section of the fabricated optical fiber may thus be flattened instead of forming a true circle. When the polymerizable monomer contains a crosslinkable monomer on the other hand, such problems are relatively hard to occur. However, they are not totally unignorable even when such a crosslinkable monomer is contained.

In the third aspect of this invention, the present invention provides a process for the fabrication of a resin-made optical fiber, which comprises:

filling a polymerizable monomer into a hollow fiber like cladding material adapted to form a cladding and made of a polymer or copolymer;

causing the resultant composite material to travel continuously in the direction of the length of the composite material and allowing the composite material to advance successively into a polymerization zone where conditions for the polymerization of the polymerizable monomer are satisfied, whereby the polymerizable monomer is successively polymerized to form a core having a refractive index greater than the cladding.

According to the above process, the polymerizable monomer filled in the hollow fiber like cladding material is polymerized successively with the portion of the polymerizable monomer, which portion is under polymerization, moving from the leading end of the composite material in the direction of the length thereof, as the composite material advances successively into the polymerization zone. Since the polymerizable monomer still retains fluidity until at least its polymerization, the polymerizable monomer is replenished to the portion, which is under polymerization, from the trailing portion if the volume of the polymerizable monomer is reduced upon its polymerization. The volume reduction is therefore compensated. As a result, it is possible to avoid occurrence of cuts in the core-forming polymer and at the same time, the flattening in cross-section of the associated cladding, thereby making it possible to fabricate a truly-circular optical fiber having the intended properties continuously without failure. Since the polymerization of the polymerizable monomer, which serves to form a core, is effected within the cladding material in the above process, the possible mixing of impurities from outer sources can be prevented and a resin-made optical fiber having good characteristics can be obtained accordingly.

The above process is now described more specifically. A polymerizable monomer is filled into a hollow channel 2 of a hollow fiber like cladding material 1, which is similar to that depicted in FIG. 1, so that a composite material is obtained. A polymerization zone which satisfies conditions for polymerizing the polymerizable monomer filled in the composite material is provided. The composite material is then caused to move continuously in the direction of its length so that the composite material is allowed to advance successively into the polymerization zone. The polymerizable monomer is therefore polymerized successively so that a core having a refractive index greater than the cladding material is formed to fabricate a resin-made optical fiber. Here, the above-described cladding material is employed as the cladding material.

A polymerizable monomer such as those mentioned above may be added, if necessary, with a polymerization initiator, polymerization additive, chain transfer agent for the regulation of molecular weight, etc. and is then filled in the hollow channel 2 of the hollow fiber like cladding material 1 in the same manner as that described above.

Figure 2:
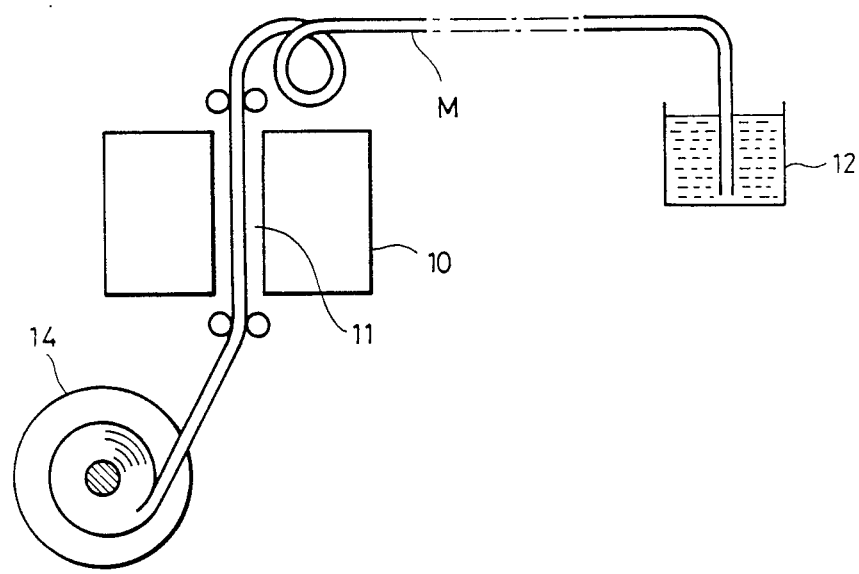
FIG. 2 schematically illustrates, by way of example, how a process according to this invention is practised.

As illustrated in FIG. 2, the thus-obtained composite material M is sealed at one end thereof and is then caused to move continuously in the direction of its length so that it is allowed to advance successively into a polymerization zone 11, which is defined by an apparatus for establishing polymerization conditions, with the thus-sealed end entering first. Accordingly, the polymerizable monomer filled inside the composite material M is polymerized in the polymerization zone. The other end of the composite material M which is composed of the cladding material and the polymerizable monomer filled in the cladding material is dipped, in the open state, in the polymerizable monomer stored in a monomer-replenishing vessel 12. After passage through the polymerization zone 11, the resultant optical fiber is taken up on a takeup drum 14.

When the polymerizable monomer is of the heat-polymerizable type in the above process, a suitable heating apparatus such as heater or heating furnace is used as the apparatus for establishing polymerization conditions. When it is of the photopolymerizable type, an ultraviolet irradiation light-source apparatus or the like is employed.

Polymerizable monomer generally tend to develop volume shrinkage upon their polymerization. The cross-section of the resulting optical fiber may hence be flattened and the core may be cut at some portions thereof, even if the cross-section of a cladding material is a true circle. In the above process, the composite material is allowed to advance, in a state sealed at one end thereof, successively into the polymerization zone with the sealed-end entering the polymerization zone first. The portion of the composite material which portion is under polymerization is hence caused to move. The polymerizable monomer still have fluidity in the unpolymerized portion trailing the portion which is under polymerization. Even if volume shrinkage occurs by the polymerization, the polymerizable monomer is supplied to the portion, which is under polymerization, so as to compensate the volume shrinkage. It is thus possible to avoid the pressure drop due to the volume shrinkage and hence the possible deformation of the cladding material and moreover, to avoid the possible occurrence of cuts in the core.

In the embodiment depicted in FIG. 2, the replenishment of the polymerizable monomer upon shrinkage in volume of the polymerizable monomer is effected automatically. The replenishment of the polymerizable monomer can however be achieved smoothly, especially, by holding the monomer-replenishing vessel 12 under pressure.

As to polymerization conditions which should be established in the polymerization zone, suitable conditions may be set up in accordance with the type of a polymerizable monomer to be used, the type and amount of a polymerization initiator to be added, and other conditions. For example, the polymerization temperature may range from room temperature to 150° C. As a polymerization initiator, a suitable polymerization initiator may be chosen depending on the type of a polymerizable monomer to be used and other parameters. A usual radical polymerization initiator or photopolymerization initiator may be used as it is. In addition, the travelling distance and speed of the composite material through the polymerization zone may also be set at suitable levels.

In this process, it is also possible to subject the composite material to a pretreatment in a stage before reaching the polymerization zone. For example, prepolymerization may be effected to increase the viscosity of the polymerizable monomer in advance. This prepolymerization is effective in that the degree of volume shrinkage of the polymerizable monomer in the polymerization zone can be limited at a low level. Needless to say, it must be avoided to conduct the pretreatment to such an degree that the fluidity of the polymerizable monomer is completely lost before it reaches the polymerization zone.

According to the above process, the composite material composed of the cladding material and the polymerizable monomer filled in the hollow channel of the cladding material is caused to move continuously in the direction of its length so that the composite material is allowed to advance successively into the polymerization zone satisfying conditions for the polymerization of the polymerizable monomer. The polymerizable monomer is hence polymerized successively to form the core the refractive index of which is greater than that of the cladding material. Accordingly, the polymerizable monomer can be chosen from a wide range of monomers. It is hence possible to obtain an optical fiber with a core made of a crosslinked polymer or a polymer permitting no melt molding. Even if a polymerizable monomer susceptible to volume shrinkage upon its polymerization is employed as the polymerizable monomer, the resulting core does not develop cuts at any portions or its cross-section is not deformed into a flattened circular shape. As a consequence, an optical fiber having the intended excellent characteristics can be fabricated without failure.

In the polymerization zone, a single strand of the composite material is continuously subjected to a polymerization treatment. The composite material is thus not caused to overlap at any portions thereof. Accordingly, it is always possible to polymerize the composite material in its entirety under uniform ocnditions. There is of course little chance of impurity inclusion which tends to occur upon melt molding, thereby making it possible to form a core having excellent light-carrying capacity.

[EXAMPLES]

EXAMPLE 1

A vinylidene fluoride resin "KF #1000" (trade name; product of Kureha Chemical Industry Co., Ltd.) was extrusion molded at an outlet temperature of 240° C. to obtain a hollow cladding material made of the fluorinated vinylidene resin and having an inner diameter of 0.8 mm and a wall thickness of 0.028 mm. The refractive index of that resin was about 1.42 at 25° C.

On the other hand, a polymerizable monomer mixture which had been obtained by mixing 0.06 part by weight of lauroyl peroxide to a mixture of 88 parts by weight of fully-purified methyl methacrylate and 12 parts by weight of a bifunctional monomer, i.e., 2,2-bis(4-methacryloxy-ethoxyphenyl)propane was placed in a thoroughly-washed vessel. One end of the cladding material was inserted in the monomer mixture stored in the vessel and the other end was connected to a vacuum pump, thereby filling the monomer mixture in the cladding material. Thereafter, both end portions of the cladding material were sealed by heating. The thus-obtained composite material was placed in a constant temperature chamber, the whole interior of which was then purged with nitrogen. The interior temperature was raised to 60° C. to initiate the polymerization of the polymerizable monomer. Sixteen hours later, the interior temperature of the chamber was raised gradually and upon elapsed time of 5 hours, the temperature was raised to 110° C. At that temperature, the composite material was left over for additional two hours to form a core, thereby obtaining an optical fiber.

The refractive index of the copolymer of the core of the optical fiber was 1.50 at 25° C. Therefore, the difference in refractive index between the cladding and the core was $$\frac{1.50 - 1.42}{1.50} \times 100 = 5.3 \, (\%)$$

The optical transmission loss was measured on that optical fiber. It was found to be about 420 dB/km at 25° C. It had sufficient light-carrying capacity even at 120° C. and hence had high heat resistance.

Incidentally, the optical transmission loss ($\alpha$) is a value obtained as a result of a calculation in accordance with the following equation:

$$\alpha = \frac{10}{l} \log \left( \frac{I_0}{I_l} \right) (dB/km)$$

where
l: length of the optical fiber (km),
$I_0$: light quantity at the emitting end face when the optical fiber had the standard length $l_0$, and
$I_l$: light quantity at the emitting end face when the optical fiber had a length l.

Setting the standard length at 10 m (i.e., $l_0 = 10$ m), both end faces of the fiber was cut at right angles to the axis of the fiber to prepare smooth faces. Using a tungsten halogen lamp as a light source, parallel rays were monochromatized through a filter which allowed transmission of light having a principal wavelength of 650 nm. The resulting monochromatic rays was caused to enter the optical fiber through one end of the optical fiber and the light quantity on the emitting end face was detected by a large-area photodiode.

EXAMPLE 2

A copolymer [P(VDF-TFE)] which had been obtained by copolymerizing vinylidene fluoride and tetrafluoroethylene at a ratio of 80:20 was extrusion molded to obtain a cladding material having an inner diameter of 0.95 mm and a wall thickness of 0.045 mm. The refractive index of the copolymer of the cladding material was 1.406 at 25° C.

On the other hand, a polymerizable monomer mixture which had been obtained by mixing 0.02 part by weight of lauroyl peroxide as a polymerization initiator to a mixture of 50 parts by weight of a fully-purified bifuctional monomer, i.e., 2,2-bis(4-methacryloxy-ethoxy-3,5-dibromophenyl)propane and 50 parts by weight of 1-methacyloxy-diethoxy-2,4,6-tribromobenzene was filled at 60° C. in the cladding material and its polymerization was conducted under the same polymerization conditions as in Example 1 except that the initial polymerization initiation temperature was changed to 40° C. An optical fiber was hence obtained. The refractive index of the copolymer of the core of that optical fiber was 1.582 at 25° C. The difference in refractive index was therefore about 11%. The optical transmission loss of that fiber was about 810 dB/km. However, that fiber had excellent heat resistance so that it retained light-carrying capacity even at 140° C.

EXAMPLE 3

In a poly(vinylidene fluoride-tetrafluoroethylene) cladding material of the same type as that employed in Example 3, a polymerizable monomer mixture formed of 100 parts by weight of diethylene glycol bis(allylcarbonate) "CR-39" and 1.0 parts of isopropyl peroxydicarbonate as a polymerization initiator was filled. In that filling step, the monomer mixture and the hollow channel of the cladding material were repeatedly purged with nitrogen gas to ensure the exclusion of oxygen gas. The composite material was gradually heated from 30° C. to 60° C. in the course of 7 hours in a nitrogen-purged oven. After allowing it to stand at 60° C. for 3 hours, it was immediately heated to 80° C. where it was held for 3 hours. The composite material was thereafter left over at 120° C. for 1 hour to complete the polymerization to form a core, thereby obtaining an optical fiber.

The refractive index of the core of that optical fiber was 1.492 at 25° C. and the difference in refractive index was 5.8%.

The optical transmission loss of that optical fiber was also measured. It was found to be 710 dB/km. That optical fiber was also excellent in heat resistance and remained light-carrying capacity even at 130° C.

EXAMPLES 4–7

Following the procedures of Examples 1–3, the following optical fibers were separately prepared. Results are shown in Table 1.

the composite material was cut outside the constant temperature chamber. The temperature of the constant temperature chamber was then raised to 110° C., at which the composite material was left over for 2 hours to form a core, thereby obtaining a optical fiber.

The refractive index of the core of the optical fiber was about 1.50 at 25° C. Further, the shape of the cross-section of the optical fiber was substantially true circle.

The optical transmission loss was measured on the optical fiber. It was found to be about 400 dB/km at 25° C. It had sufficient light-carrying capacity even at 120° C. and hence had high heat resistance.

EXAMPLE 9

In a polyvinylidene fluoride cladding material of the same type as that employed in Example 1, a polymerizable monomer mixture composed of 100 parts by weight of purified methyl methacrylate and 0.2 part by weight of n-propyl peroxydicarbonate as a polymerization initiator was filled to obtain a composite material. The composite material was subjected to a polymerization treatment under the same conditions as in Example 8, thereby obtaining an optical fiber.

TABLE 1

|  | Example 4 | | Example 5 | | Example 6 | | Example 7 | |
|---|---|---|---|---|---|---|---|---|
| Cladding material | PVDF | | P(VDF—TFE) | | P(VDF—TFE) | | PVDF | |
| Types and proportions of core-forming monomers | CR-39 | 80 | MMA | 80 | MMA | 90 | MMA | 90 |
|  | DAP[1] | 20 | EDMA[3] | 20 | TMPT[5] | 10 | TAIC[6] | 10 |
| Types and proportions of polymerization initiators | IPP[2] | 0.8 | TBPO[4] | 0.004 | LPO[7] | 0.004 | LPO | 0.002 |
|  |  |  | IPP | 0.01 |  |  |  |  |
| refractive index (a) of cladding material | 1.42 | | 1.405 | | 1.405 | | 1.42 | |
| Refractive index (b) of core | 1.504 | | 1.48 | | 1.48 | | 1.49 | |
| Difference between (a) and (b) (%) | 5.6 | | 5.1 | | 5.1 | | 4.7 | |
| α (dB/km) | 580 | | 410 | | 400 | | 460 | |

[1]DAP: Diallyl phthalate
[2]IPP: Isopropyl peroxydicarbonate
[3]EDMA: Ethylene glycol dimethacrylate
[4]TBPO: Tert-butylperoxy-2-ethyl hexanoate
[5]TMPT: Trimethylolpropane trimethacrylate
[6]TAIC: Triallyl isocyanate
[7]LPO: Lauroyl peroxid
[8]P(VDF—TFE): VDF:TFE = 70:30.
(Note: All figures pertaining to proportions or ratios are parts by weight. The refractive indexes are all at 25° C.).

EXAMPLE 8

A polymerizable monomer mixture was prepared by adding 0.3 part by weight of isopropyl peroxydicarbonate to a mixture of 88 parts by weight of fully-purified methyl methacrylate and 12 parts by weight of a bifunctional monomer, i.e., 2,2-bis(4-methacryloxy-ethoxyphenyl)propane. The polymerizable monomer mixture was then placed in a thoroughly-washed vessel. One end of a polyvinylidene fluoride cladding material of the same type as that employed in Example 1 was inserted in the monomer mixture stored in the vessel and the other end was connected to a vacuum pump, thereby filling the monomer mixture in the cladding material. Thereafter, one end of the cladding material was sealed by heating. The thus-obtained composite material was placed successively into a constant temperature chamber, which had been purged with nitrogen gas and heated to 80° C., with the sealed end entering first. The polymerizable monomer was polymerized while taking up the composite material continuously at a speed of about 2 m/hr on a takeup drum disposed within the constant temperature chamber. When the taken-up length of the composite material reached 30 m, The refractive index of the core of the optical fiber at 25° C. was about 1.49.

Further, the shape of the cross-section of the optical fiber was substantially true circle and its optical transmission loss was about 380 dB/km at 25° C. No disconnected portions were observed in the core.

EXAMPLE 10

A copolymer which had been obtained by copolymerizing vinylidene fluoride and tetrafluoroethylene at proportions of 80:20 was extrusion molded to obtain a cladding material having an inner diameter of 0.95 mm and a wall thickness of 0.045 mm. The refractive index of the copolymer of the cladding material was 1.406 at 25° C.

A polymerizable monomer mixture composed of 100 parts by weight of purified methyl methacrylate and 0.1 part by weight of n-propyl peroxydicarbonate as a polymerization initiator was filled in the same manner as in Example 8. The resultant composite material was left over for 5 hours. Thereafter, the cladding material was sealed at one end thereof. The thus-obtained composite material was placed successively into a constant temperature chamber, which had been purged with nitrogen gas and heated to 80° C., with the sealed end entering first. The polymerizable monomer was polymerized while taking up the composite material continuously at a speed of about 2 m/hr on a takeup drum disposed within the constant temperature chamber. When the taken-up length of the composite material reached 30 m, the composite material was cut outside the constant temperature chamber. The composite material was left over at the same temperature for further 5 hours to form a core, thereby obtaining an optical fiber.

The refractive index of the core of the optical fiber was about 1.49 at 25° C.

Further, the shape of the cross-section of the optical fiber was substantially true circle and its optical transmission loss was about 390 dB/km at 25° C.

Having now fully described the invention, it will be apparent to one of ordinary skill in the art that many modifications and changes can be made thereto without departing from the spirit or scope of the invention as set forth herein.

We claim:
1. A polymeric optical fiber comprising:
   a core of a polymer obtained from a crosslinkable monomer or of a copolymer obtained from a monomer composition which comprises at least 1 wt % of a crosslinkable monomer and at least one monomer selected from a group consisting of acrylates, methacrylates and aromatic vinyl compounds, said crosslinkable monomer being selected from a group consisting of acrylic or methacrylic esters of poly-hydric alcohols, divinyl aromatic compounds and poly-allyl compounds, and
   a cladding of a polymer or copolymer having a refractive index smaller than the core.
2. The optical fiber of claim 1 wherein the core polymer is polymerized in the cladding polymer.
3. The optical fiber of claim 1 wherein the refractive index of the cladding is at least 3% smaller than the core.
4. The optical fiber of claim 1 wherein the poly-hydric alcohols are di-hydric alcohols and the poly-allyl compounds are di-allyl compounds.

* * * * *